May 19, 1964  G. F. UPTON  3,134,037
MOTOR WITH HYDRODYNAMIC SUPPORTED ROTOR
Filed Oct. 21, 1960  2 Sheets-Sheet 1

INVENTOR
GEORGE F. UPTON
BY
Watson, Cole, Grindle & Watson
ATTORNEYS

United States Patent Office 3,134,037
Patented May 19, 1964

3,134,037
MOTOR WITH HYDRODYNAMIC SUPPORTED ROTOR
George Frank Upton, Borehamwood, England, assignor to D. Napier & Son Limited, London, England, a company of Great Britain
Filed Oct. 21, 1960, Ser. No. 64,106
1 Claim. (Cl. 310—90)

This invention relates to rotary energy converting machines of the kind having a rotor and shaft assembly mounted so that the rotor can rotate in a casing relatively to a stator, such as electric motors, electric generators, turbines, rotary pumps and compressors.

The term "rotor" is used herein to mean only the rotatable body, e.g. an armature or impeller or the like, from which the shaft projects at one or both ends. The term "rotor and shaft assembly" is used to designate the combination or assembly consisting of the rotor and the shaft.

It is an object of the invention to provide such a rotary energy converting machine in which the overall length of the rotor and shaft assembly can be shorter than would be the case if the assembly were supported for rotation in the conventional manner by bearings which support the shaft and are disposed on the shaft outside the length of the rotor.

Reduction in overall length has the advantage not only of saving space but also of reducing problems arising from whirling phenomena which are often encountered with conventionally mounted rotors in high speed operation.

A further object of the invention is to provide a large bearing area and low loading per unit of bearing area. This facilitates the employment of low friction hydrodynamic gas bearings or gas-lubricated bearings.

According to the invention, in a rotary energy converting machine the rotor is surrounded by a bearing for at least a part of its length within the casing.

In one form of the invention the rotor is provided with a cylindrical drum which is coaxial with the axis of rotation and which defines an annular recess between itself and the rotor, which recess accommodates at least a part of the stator, the inner or outer surface of this drum providing a bearing surface for the rotor. In this case the stator must be overhung, i.e. it must project in cantilever fashion from the casing.

The bearing may be divided axially so that it consists of two or more pairs of cylindrical bearing surfaces, the pairs being spaced apart in the axial sense or it may consist of only a single pair of cylindrical bearing surfaces the axial extent of which is sufficient to afford support against tilting of the rotor.

Preferably the bearing is of the hydrodynamic or hydrostatic gas bearing type, which has advantages such as low friction losses.

Figure 5:
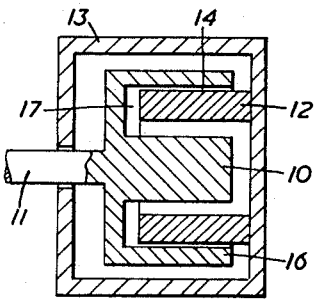
Figure 6:
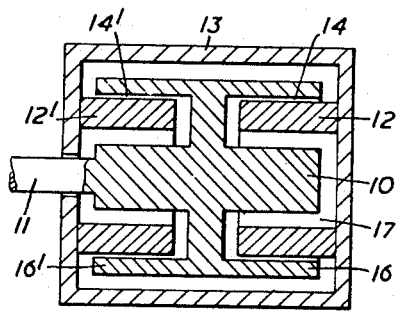
Figure 7:
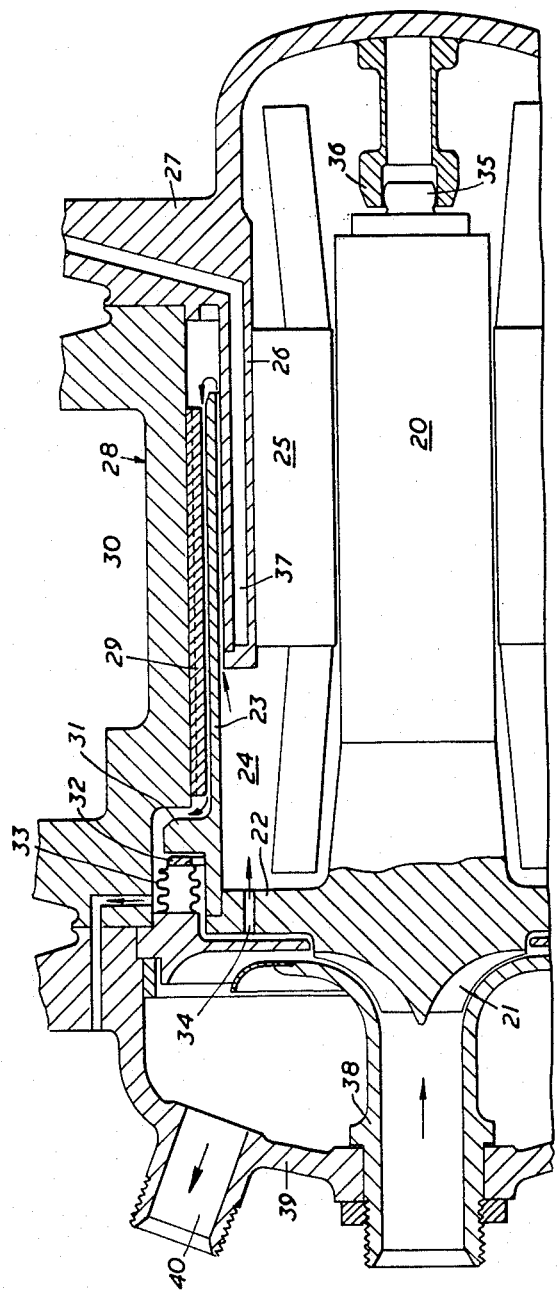

The invention may be performed in various ways and some embodiments will now be described by way of example with reference to the accompanying drawings, in which:

FIGURES 1 to 6 are respectively diagrammatic sectional elevations of rotary machines embodying the invention and each comprising a rotor, a rotor shaft, a stator, a casing and at least one rotor bearing within the casing, and illustrating a number of different relative dispositions of these parts; and FIGURE 7 is a sectional elevation of the upper half of a sealed electric motor and compressor assembly embodying the invention.

In FIGURES 1 to 6 corresponding parts have been given the same reference numerals.

Figure 1:
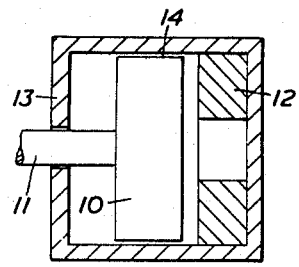

The machine shown in FIGURE 1 comprises a rotor disc 10 connected to a shaft 11 through which the drive is transmitted. The shaft 11 is not directly supported in journal bearings. The rotor disc 10 co-operates with a single annular stator 12, both the rotor and the stator being contained within a casing 13. The rotor disc 10 is supported for rotation in a single hydrodynamic gas bearing 14 the inner surface of which is the cylindrical peripheral surface of the rotor disc 10 while its outer surface is a cylindrical surface of slightly larger diameter formed in the casing 13 of the machine. Gas is supplied through a passage that is not shown to the space between these two cylindrical surfaces.

Figure 2:
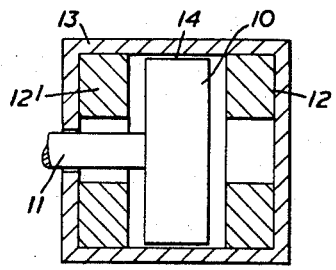

In FIGURE 2 there is a second stator 12' similar to the stator 12 but on the opposite side of the rotor disc 10.

Figure 3:
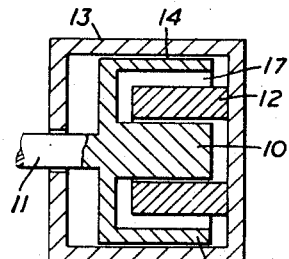

In FIGURE 3 the rotor 10 is in the form of a cylinder and is provided with a hollow cylindrical drum 16 which is coaxial with the rotor but is spaced therefrom to provide an annular space 17 which accommodates the major part of the stator 12. A small annular clearance between the cylindrical outer surface of the drum 16 and the internal cylindrical surface of the casing 13 provides a hydrodynamic gas bearing 14 for the rotor assembly.

Figure 4:
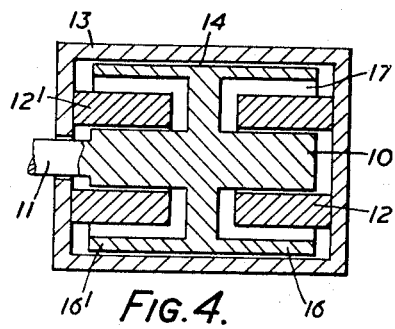

In FIGURE 4 the rotor carries a double hollow drum 16, 16' and there are two stators 12 and 12'.

FIGURE 5 is somewhat similar to FIGURE 3, but in this case the gas bearing 14 is provided between the internal cylindrical surface of the drum 16 and the stator 12.

FIGURE 6 is somewhat similar to FIGURE 4, but in this case there are two gas bearings 14 and 14' between the internal cylindrical surfaces of the double drum 16 and 16' and the stators 12 and 12' respectively.

In the sealed electric motor and centrifugal compressor assembly shown in FIGURE 7, the rotor 20 and the compressor impeller 21 are fixed together coaxially. Between the rotor and the impeller there is a radial flange 22, and from this radial flange there extends a hollow cylindrical drum 23 which surrounds the rotor 20 for part of the length of the latter and defines between itself and the rotor an annular space 24 which accommodates the stator 25 of the motor. The stator 25 is of hollow cylindrical form and is mounted in a hollow cylindrical member 26 which is supported as a cantilever from an end wall 27 of the casing 28 so that it projects into the said annular space 24.

The outer cylindrical surface of the drum 23 co-operates with an inwardly-facing cylindrical surface of slightly larger diameter formed in a sleeve 29 fixed to the casing 28 to provide a gas bearing 30 of the hydrodynamic type, which affords the sole journal bearing for the rotor.

Near to the radial flange 22 the drum 23 is provided with an annular lip 31 which acts as a seating for a gas thrust bearing. The thrust ring 32 of the thrust bearing is mounted on a fluid-filled annular bellows 33 to cater for any slight misalignment between the rotor and the seal location on the casing.

At least one bore 34 is provided through the annular flange 22, one end of this bore communicating with the delivery side of the compressor impeller 21 and the other end of this bore communicating with the annular space 24, whereby the resultant gas pressure acting towards the left on the rotor assembly tends to hold the annular lip 31 close to the thrust ring 32.

The gas for the gas bearing 30 may be the gas which enters the annular space 24 through the bore 34, this gas flowing in the direction of the arrows. Gas from the delivery side of the compressor impeller 21 also flows to the gas thrust bearing 31, 32.

The end of the rotor remote from the pump impeller is provided with a central boss 35 which is a clearance fit in a flexibly mounted steadying bearing 36 secured to the end wall 27 of the casing. The purpose of this steadying bearing is to limit any whip which the rotor might experience, but it will be appreciated that owing to the relatively short axial length of the rotor this whip will in any case be substantially less than in a conventional rotor having a shaft which extends beyonds its ends, the projecting portions of the shaft being mounted in bearings.

To cool the stator, cooling passages 37 are provided in the cylindrical member 26.

An inlet passage 38 for the compressor portion of the assembly passes through the front wall 39 of the casing 28, while an outlet passage 40 is formed in this wall.

What I claim as my invention and desire to secure by Letters Patent is:

A dynamoelectric machine comprising a casing having a cylindrical internal surface, an armature rotatable within said casing about an axis of rotation, a shaft fixedly connected to said armature and projecting therefrom coaxially with said axis of rotation, a hollow drum having a cylindrical external surface and fixedly connected to said armature coaxially with said axis of rotation, said drum being outwardly spaced from said armature and defining at least one annular recess between itself and said armature, at least one stator carrying field windings fixedly mounted within said casing with at least a part thereof projecting into said annular recess between said armature and said drum and in radially spaced relation thereto, bearing means for said armature having two co-operating bearing surfaces to support said armature for rotation in said casing in co-operating relatively rotatable relationship with said stator, at least a part of said cylindrical external surface of said drum constituting one of said co-operating bearing surfaces and at least a part of said cylindrical internal surface of said casing constituting the other of said co-operating bearing surfaces, said two bearing surfaces being radially spaced apart by a small clearance, and a film of gas in said clearance which dynamically supports said armature during high-speed rotation thereof.

References Cited in the file of this patent
UNITED STATES PATENTS

| | | |
|---|---|---|
| 2,889,474 | Macks | June 2, 1959 |
| 2,916,642 | Macks | Dec. 8, 1959 |
| 2,928,960 | Macks | Mar. 15, 1960 |
| 2,937,294 | Macks | May 17, 1960 |
| 2,983,832 | Macks | May 9, 1961 |